United States Patent [19]
Ross et al.

[11] Patent Number: 5,351,194
[45] Date of Patent: Sep. 27, 1994

[54] APPARATUS AND METHOD FOR CLOSING FLIGHT PLANS AND LOCATING AIRCRAFT

[75] Inventors: John Ross, Marietta; Tom Farmakis, Sharpsburg, both of Ga.

[73] Assignee: World Wide Notification Systems, Inc., Marietta, Ga.

[21] Appl. No.: 62,406

[22] Filed: May 14, 1993

[51] Int. Cl.$^5$ .............................................. G01S 3/02
[52] U.S. Cl. .................................... 364/449; 364/443; 364/439; 342/451; 342/357
[58] Field of Search ............... 364/428, 439, 441, 443, 364/446, 460, 447, 449; 73/178 R; 340/904, 947, 948, 951, 960, 991, 992; 342/33-35, 42, 450, 357, 451, 457, 463, 464; 379/59

[56] References Cited
U.S. PATENT DOCUMENTS

| | | | |
|---|---|---|---|
| 3,886,515 | 5/1975 | Cottin et al. | 340/23 |
| 4,009,375 | 2/1977 | White et al. | 235/150.24 |
| 4,220,946 | 9/1980 | Henriot | 340/23 |
| 4,325,057 | 4/1982 | Bishop | 340/539 |
| 4,360,875 | 11/1982 | Behnke | 364/436 |
| 4,642,775 | 2/1987 | Cline et al. | 364/443 |
| 4,688,026 | 8/1987 | Scribner et al. | 340/572 |
| 4,791,571 | 12/1988 | Takahashi et al. | 364/436 |
| 4,799,162 | 1/1989 | Shinkawa et al. | 364/436 |
| 4,891,650 | 1/1990 | Sheffer | 342/457 |
| 4,910,493 | 3/1990 | Chambers et al. | 340/426 |
| 5,014,206 | 5/1991 | Scribner et al. | 364/449 |
| 5,021,780 | 6/1991 | Fabiano et al. | 340/994 |
| 5,032,845 | 7/1991 | Velasco | 342/457 |
| 5,043,736 | 8/1991 | Darnell et al. | 342/357 |
| 5,055,851 | 10/1991 | Sheffer | 342/457 |
| 5,099,245 | 3/1992 | Sagey | 342/463 |
| 5,103,459 | 4/1992 | Gilhousen et al. | 375/1 |
| 5,168,451 | 12/1992 | Bolger | 364/436 |
| 5,197,009 | 3/1993 | Hoffmann, Jr. et al. | 364/443 |
| 5,208,756 | 5/1993 | Song | 342/457 |
| 5,216,429 | 6/1993 | Nakagawa et al. | 342/450 |
| 5,218,367 | 6/1993 | Sheffer et al. | 342/457 |
| 5,218,629 | 6/1993 | Dumond, Jr. et al. | 379/59 |
| 5,221,925 | 6/1993 | Cross | 340/988 |
| 5,223,844 | 6/1993 | Mansell et al. | 342/457 |
| 5,243,529 | 9/1993 | Kashiwazaki | 364/449 |

FOREIGN PATENT DOCUMENTS

| | | | |
|---|---|---|---|
| 2559930 | 8/1985 | France | 340/994 |
| 0123562 | 4/1983 | United Kingdom . | |
| 8311303 | 4/1983 | United Kingdom . | |
| 8816449 | 7/1988 | United Kingdom . | |

OTHER PUBLICATIONS

Chapman Security Systems, Inc. (Bensenville, Illinois), "Chapman 911CLS", Product Catalogue, undated 4 pages.

"Device Lets Motorists Send 'Mayday' At Touch of Button," The Atlanta Journal/The Atlanta Constitution, May 18, 1993.

International Teletrac Systems, "Have an Unfair Advantage Over Car Thieves", Advertising Flyer, 1990, 3 pages.

(List continued on next page.)

*Primary Examiner*—Gary Chin
*Attorney, Agent, or Firm*—Howrey & Simon

[57] ABSTRACT

An apparatus and method of canceling a flight plan of an aircraft to facilitate release of an IFR airspace to other aircraft and for communicating the location of a downed aircraft during emergencies. A controller receives and analyzes positioning signals transmitted from know locations to determine the location of the aircraft periodically. Upon arrival of the aircraft at its destination, the controller calls the air traffic controllers to cancel the flight plan. In the event of an emergency, the controller calls the air traffic control center to report the emergency and the location of the aircraft with high accuracy to improve search and rescue operations.

20 Claims, 2 Drawing Sheets

OTHER PUBLICATIONS

Internatinoal Teletrac Systems, "How to Put Your Fleet on the Map", Advertising Flyer, undated, 5 pages.

Klass, Philip J., "Airline Officials Foresee Quick Growth in Use of GPS, Glonass on Commercial Transports", *Aviation Week and Space Technology*, Jun. 29, 1992, p. 54.

Klass, Philip J., "FAA Steps Up Program to Introduce GPS as Instrument Approach Aid", *Aviation Week and Space Technology*, Aug. 17, 1992, pp. 35–36.

Klass, Philip J., "GPS Demonstration Results Push System Into Forefront for Airport Traffic Plan", *Aviation Week and Space Technology*, Dec. 16, 1991, p. 42.

Logsdon, Tom, *The Navstar Global Positioning System*, Van Nostrand Reinhold, 1992.

Mets, Inc. (Indianapolis, Indiana), "Public Safety Police, Fire and Emergency Medical Services", 1989, 4 pages.

Mets, Inc. (Indianapolis, Indiana), "Trucking National & Regional Fleet Control", 1989, 4 pages.

Nordwall, Bruce D., "Low Price, New Ideas Fuel GPS Growth", *Aviation Week and Space Technology*, Nov. 30, 1992, p. 48.

Nordwall, Bruce D., "Imagination Only Limit to Military, Commercial Applications for GPS", *Aviation Week and Space Technology*, Oct. 14, 1991, p. 60.

Nordwall, Bruce D., "Flight Tests Highlight New GPS Uses, Emphasize Need for GPS/Glonass System", *Aviation Week and Space Technology*, Dec. 2, 1991, p. 71.

Trimble Navigation (Sunnyvale, California), "Fleetvision Integrated Fleet Management System", undated, 9 pages.

Trimble Navigation (Sunnyvale, California), "Starfinder GPS Intelligent Mobile Sensor", 1991, 2 pages.

Trimble Navigation (Sunnyvale, California), "Starview Tracking and Display Station", undated, 1 page.

Westinghouse (Baltimore, Maryland), "Vehicle Management Systems", Product Catalogue, undated, 4 pages.

APPARATUS AND METHOD FOR CLOSING FLIGHT PLANS AND LOCATING AIRCRAFT

TECHNICAL FIELD

The present invention generally relates to location tracking apparatus. More particularly, the present invention relates to an apparatus and method for closing aircraft flight plans and locating aircraft in emergencies.

BACKGROUND OF THE INVENTION

Aircraft operate in flight under guidelines generally known as instrument flight rules (IFR) and visual flight rules (VFR). Under IFR travel, the pilot must file an IFR flight plan with air traffic control (ATC) and obtain an IFR clearance to fly a specified route and altitude to the destination airport. Continuous two-way radio communication between the aircraft and ATC is required. The flight plan information includes the departure airport, the destination airport, the route and altitude of flight, the estimated time of arrival, the amount of fuel on board, the number of passengers on board, type of aircraft and identification number, and phone numbers for persons to contact in emergencies.

IFR travel occurs in both radar and non-radar environments. In the radar environment, the position, air speed, and altitude of the aircraft are constantly updated to the air traffic controllers. The ATC tracks the aircraft on radar monitors. In an emergency, the pilot notifies ATC through radio voice communications and transponder signals. ATC continues to track the aircraft, and in the event it is downed, ATC has a reasonable estimate of its location on the ground, within a few miles. The accuracy of the location however is dependant on a number of factors. These factors include the altitude of the plane at the time radar contact is lost, the air speed of the aircraft, the distance to the radar facility, and the terrain.

In non-radar IFR environment, the air traffic controller depends on positioning reports given by the pilot at specific reporting points. The positioning report includes the time of arrival at the point, the altitude, and the estimated time of arrival at the next reporting point. The reporting points vary in distance apart, and may range from several miles to about one hundred thirty miles apart. In an emergency, the pilot notifies ATC as discussed above and provides his last known location. The location of the downed aircraft then can be estimated, but this estimate is generally less accurate than in a radar environment. Should the emergency prevent communication with ATC, the estimate may be even less accurate.

All IFR flight plans must be closed so that ATC knows that the aircraft has landed safely. When an IFR flight lands at a controlled airport, tower personnel automatically cancel the flight plan for the pilot. When an IFR flight lands at an uncontrolled airport, the pilot continues to have the responsibility to close the flight plan. The flight plan can be closed in flight if the aircraft can land during visual meteorological conditions. The cancellation can then be communicated to ATC by two-way radio. In instrument meteorological conditions, cancellation can only be made after the aircraft has landed. Physical limitations of VHF radio communications however can prevent the pilot from canceling the flight plan by radio. In that situation, the pilot is responsible for canceling the flight plan by telephone. Pursuant to ATC regulations, cancellation of an IFR flight plan must occur shortly after the estimated time of arrival. If this interval is exceeded, a search is begun, as discussed below. It may take several minutes to taxi, secure the aircraft and passengers, and locate a telephone. Until the flight plan is canceled the controlled airspace is restricted from use by other aircraft. ATC can not release the airspace for other landings or takeoffs until the open flight plan is canceled. Prompt cancellation of the flight plan by the pilot allows other aircraft to use the airspace sooner.

As discussed above, meteorological conditions having appropriate distance visibility allow aircraft to fly under visual flight rules (VFR). Aircraft flying under visual flight rules are encouraged to file a flight plan, but are not required to do so. The flight plan information provides search and rescue protection for the pilot in the event of an emergency. The VFR flight plan must be closed within thirty minutes of the estimated time of arrival for the aircraft at the destination, or authorities will begin a search, as discussed below. In the event of an emergency, the location of the downed VFR aircraft can not be estimated with any high degree of accuracy. Estimates are made based on the flight plan data and take into account the range of the aircraft around the planned route.

The initial search is typically conducted by telephone. Personnel with the Federal Aviation Administration call the contact phone numbers listed in the flight plan to determine whether the aircraft has landed safely. If the pilot or aircraft is not located, an air and ground search begins for the possibly downed aircraft. Searches involve many persons, organizations, and additional aircraft. Search efforts are expensive and time-consuming. Air search efforts include flying the route stated in the flight plan and flying grids based on the last known location of the aircraft, its air speed, its direction of travel, and the wind speed and direction. A grid is a geographical area defined by longitudinal and latitudinal coordinates. It may take several hours or even days for a search to locate a downed aircraft. Weather conditions may prevent starting the air search immediately. In one known instance, an aircraft taking off from an airport went down approximately one and one-half miles from the runway in snowy weather. The plane was not located until almost four hours later.

To assist in the search and rescue of downed aircraft, all aircraft currently carry an emergency locator transmitter. The transmitter broadcasts a VHF signal which is traced by search and rescue aircraft using triangulation or homing procedures. The speed of the search depends on the accuracy of tracking the signal. Accuracy depends on several factors including the type of radio receiving equipment carried in the search aircraft, the geographic terrain of the area in which the aircraft went down, and the strength of the signal broadcast by the locator transmitter. The transmitter is battery powered, and the duration of transmission depends on the strength of the batteries. While the emergency locator transmitter has proved successful in assisting the location of downed aircraft, the various factors affecting accuracy tend to slow the search efforts. Also, the downed aircraft may have drifted off its planned flight route, so the search may be initiated many miles from where the aircraft is.

Accordingly, there is a need in the art for an apparatus and method of canceling aircraft flight plans and to improve the effectiveness of searches for downed aircraft.

SUMMARY OF THE PRESENT INVENTION

The present invention provides an apparatus and method of canceling aircraft flight plans and to report the location of downed aircraft or aircraft having in-flight problems. More particularly, the present invention provides an apparatus and method that determines the location of the aircraft and reports the location to air traffic control. The apparatus cancels the flight plan for an aircraft that has landed at the destination airport or reports the location of the downed aircraft with high accuracy.

Generally described, the present invention comprises a controller which attaches to an aircraft and which communicates with a receiver. The receiver receives positioning signals from a plurality of transmitters located at known positions. The controller analyzes the positioning signals to determine the location of the aircraft. An interface connects to the controller for communicating with air traffic control. The communication cancels the flight plan or in emergencies reports the location of the aircraft. The interface preferably accesses a cellular telephone system to call the air traffic control.

The present invention provides a method for canceling the flight plan and for reporting the location of an aircraft needing assistance either in flight or on the ground. A receiver receives and communicates a plurality of positioning signals to a controller mounted in the aircraft. The signals are broadcast from transmitters at known locations. The controller analyzes the positioning signals to determine the location of the aircraft. If the aircraft has landed, the controller accesses a communication apparatus to contact the flight service station. Preferably, the communications apparatus connects with a transmitter, a receiver and a telephone dialer for accessing a cellular telephone system. The controller call the appropriate air control authority to cancel or close the flight plan. If the aircraft is downed or in difficulty, the controller calls the flight control authority to report the location of the aircraft and to initiate the search and rescue efforts.

Accordingly, it is an object of the present invention to reduce the time required to search and rescue downed aircraft.

It is another object of the present invention to facilitate cancellation of a flight plan.

It is another object of the present invention to increase the accuracy of estimating the location of a downed aircraft.

It is another object of the present invention to reduce the delay in releasing airspace in IFR conditions at an uncontrolled airport.

It is another object of the present invention to reduce the necessity for an air search during rescue of a downed aircraft.

It is another object of the present invention is to improve the methods required to search and locate downed aircraft.

These and other objects, advantages and features of the present invention will become apparent from a reading of the following detailed description of the invention and claims in view of the appended drawings.

DETAILED DESCRIPTION OF THE PREFERRED EMBODIMENTS

Figure 1:
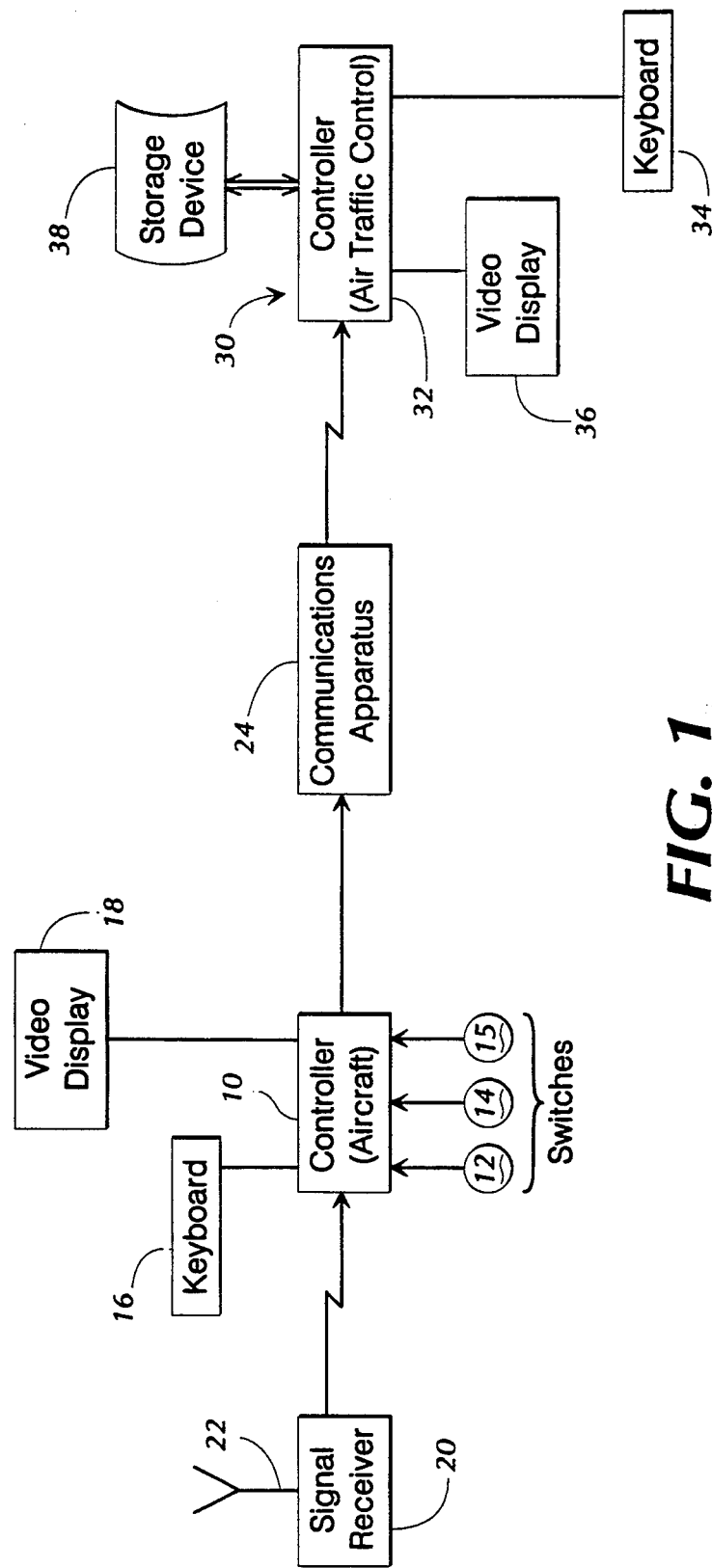
FIG. 1 is schematic view of an apparatus for canceling a flight plan and for reporting the location of an aircraft.

Referring now in more detail to the drawings, in which like numerals indicate like parts throughout the several views, FIG. 1 illustrates a schematic view of an apparatus for canceling a flight plan and for tracking and reporting the location of an aircraft. The apparatus includes a controller 10 that mounts in the aircraft. The controller 10 preferably mounts in a location that is readily secure with supports that accommodate high impact forces, such as the type of supports used with in-flight voice and data recorders. The controller 10 connects to a switch 12 that moves under a high-impact force from a first off-position to a second actuated-position, for a purpose discussed below. A second switch 14 communicates with the controller 10 for signalling that the flight plan is to be canceled. In one embodiment, the second switch 14 is manually activated by the pilot; in another embodiment the second switch 14 connects to the landing gear of the aircraft for automatic activation. A third manual switch 15 communicates with the controller 10, for a purpose discussed below. The three switches accordingly are responsive to the status of the aircraft. The controller 10 includes a keyboard 16 and a video display 18 for entering and displaying information in the controller.

A receiver 20 communicates with the controller 10. The receiver 20 includes an antenna 22 for receiving signals broadcast by a plurality of transmitters operating at separate known locations. The controller 10 connects to an interface which operatively engages a communications apparatus 24. In a preferred embodiment, the communications apparatus 24 includes a transmitter, a receiver, and a telephone dialing mechanism for accessing a cellular telephone system. For example, the communications apparatus 24 connects to a conventional cellular telephone. The controller 10 uses the cellular telephone to communicate with a flight control center 30 for tracking and locating the aircraft. The controller 10 accordingly is a device operatively associated with an aircraft for monitoring and reporting the location of the aircraft.

The flight control center 30 includes a controller 32 for receiving telephone messages from the controller 10. The controller 32 at the flight control center 30 is capable of receiving signals from a plurality of controllers 10 mounted in a separate aircraft, for purposes of tracking a plurality of aircraft simultaneously. The controller 32 responds to instructions entered by an operator through a keyboard 34. A video display screen 36 displays information about the aircraft and its location. This information would include the information in the flight plan filed by the pilot as well as the aircraft identification number. The display 36 can also show a map grid with an indicator designating the location of the aircraft.

The controller 32 accesses a storage device 38 which maintains the flight plan information filed by pilots. The storage device 38 also includes the mapping information for displaying the geographic grid and location of the aircraft. The controller 32 at the flight control center 30 is preferably a main frame, high speed computer or electronic complex capable of communicating with a plurality of controllers 10 in separate aircraft.

The flight control center 30 communicates through telephone or radio to search authorities 34 for tracking and rescue operations for downed aircraft, as discussed below.

The apparatus in operation requires that the pilot file the flight plan with the flight control center 30 in the conventional manner. The flight plan is entered to the storage device 38. The pilot also enters the flight plan into the controller 10 using the keyboard 16. The information is displayed on the video screen 18. In a preferred embodiment, the controller 10 provides a list of items to be included by the pilot. Some items are standard and may not change one flight to the next. For example, a national rescue center could coordinate initial search and rescue activities, and the controller could be programmed to call this center in the event the aircraft is in difficulty or is downed.

Figure 2:
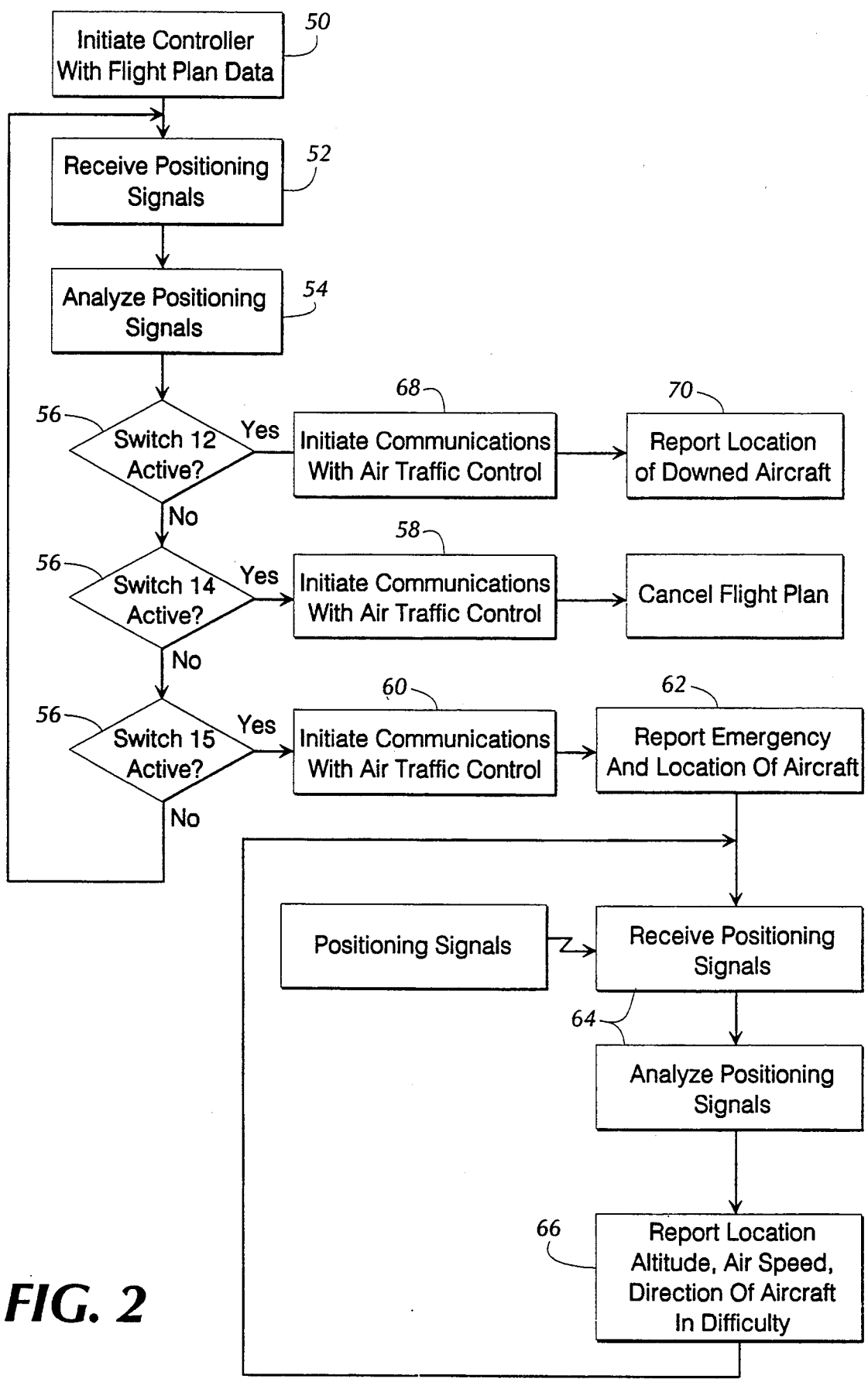
FIG. 2 is a flow chart of the method of reporting the location of an aircraft in difficulty.

FIG. 2 illustrates a flowchart of a preferred embodiment of the method of canceling the flight plan and of tracking and reporting the location of the aircraft in difficulty. The flight plan is first entered 50 to the controller 10 as discussed above. The controller 10 then begins a repeating cycle of tracking the aircraft. The receiver 20 receives 52 a plurality of positioning signals from the remote transmitters (not illustrated). In a preferred embodiment, the transmitters are satellites positioned in low earth orbit associated with a global positioning system known as GPS. The controller 10 analyzes 54 the signals to determine the location of the aircraft. The positioning signals are analyzed to determine the longitudinal and latitudinal coordinates of the location of the aircraft. The location is determined with a high degree of accuracy to within approximately three meters. The controller 10 polls 56 the switches 12, 14, and 15 to determine the status of the aircraft. If activated (as discussed below), the controller 10 takes appropriate action. If any of the switches are not active, the controller repeats the steps of receiving and analyzing positioning signals periodically and polling. In a preferred embodiment, the controller 10 determines the location of the aircraft every 15 seconds. This period can be changed by command entered from the keyboard 16.

During approach to the destination airport or after landing, the pilot activates the second switch 14. The second switch 14 could be automatically operated, such as operatively connecting the switch 14 to the landing gear. After the aircraft has landed the second switch 14 communicates with the controller 10 to cancel 58 the flight plan. In response to the switch 14, the controller 10 initiates communication with the flight control center 30 through the communications apparatus 24. The controller 10 communicates with the controller 32 at the flight control center 30 to cancel the flight plan. This information preferably is communicated in coded form to the controller 32. The information includes the aircraft identification number so the proper flight plan is canceled. The controller 32 accesses the storage device 38 to determine the flight plan data. The controller 32 then preferably confirms cancellation by responding through the communications apparatus 24 to the controller 10.

The apparatus of the present invention further facilitates search and rescue of downed aircraft. In the event of a mid-flight emergency, the pilot activates 60 the controller 10 by operating the manual switch 15. The pilot then continues to fly the aircraft and overcome the difficulty. The controller 10 in the meantime initiates communication with the flight control center 30 through the communications apparatus 24. The controller 10 provides 62 the center 30 with the aircraft identification number and location. The controller 32 accesses the storage device 38 to determine the flight plan data for display on the screen 36. FAA personnel can then provide the pilot with assistance and begin planning search and rescue efforts.

The controller 10 continues 64 to receive positioning signals from the remote transmitters and to analyze the signals to determine the location of the aircraft. The location coordinates are continuously reported 66 to the flight control center 30 so that the rescue effort has the latest location information for the aircraft. In an alternate embodiment, the controller 10 communicates with instrumentation of the aircraft, so that the controller can also communicate 66 the altitude, air speed, and direction of the aircraft to the center 30.

In the event the aircraft is downed without the pilot activating the controller as discussed above, the first switch 12 operates under a high-impact force. The switch 12 moves from the first off-position to the second actuated-position. The controller 10 is thereby activated 68 to initiate communication with the flight control center 30. The controller 10 communicates 70 the aircraft identification number and the location as determined above (see 52 and 54 in FIG. 2). In an alternate embodiment, the controller 10 continues to receive and analyze the positioning signals and to report the location of the aircraft. The location is determined with high accuracy, and this facilitates search and rescue operations.

A preferred embodiment of the present invention uses a microprocessor, such as that for a Travelmate 4000 Texas Instrument notebook computer, for the controller 10. The microprocessor communicates with the switches 12, 14, and 15, and the keyboard 16. Information entered to the microprocessor is displayed on the monitor 18. The controller 10 communicates with the signal receiver 20, for receiving the GPS positioning signals. The microprocessor communicates in both a transmitting and receiving mode with the communications apparatus 24 which preferably is a cellular telephone apparatus. For transmitting, the controller 10 communicates through an interface including a Texas Instruments SN65CBC176 driver to a cellular modem for accessing the cellular system. A Texas Instruments TL052 amplifier feeds the signal from the driver to a TLE2062 amplifier to match with telephone line signals. For receiving, the cellular modem communicates with a Texas instruments SN75CBC176 receiver through a TLE2062 line matching amplifier and a TL052 amplifier. A Texas Instruments TLC1550 analog-to-digital converter converts the received signal for input to the microprocessor through an interface that includes a Texas Instruments SN75LBL176 receiver. This enables the controller 10 to access the communications apparatus 24 for communicating with the flight control center 30.

The present invention accordingly provides an apparatus and method of reporting the status of an aircraft, including canceling a flight plan and notifying emergency response personnel of the location of a downed aircraft with a high degree of accuracy. An embodiment of the present invention however is useful for assisting search and rescue of ships in distress. In an imminent emergency, crew activate the controller 10 for communicating the location of the ship with high accuracy to a central monitoring facility. Ocean rescue operations are thereby initiated sooner and with increased reliability as to the location of the ship. In the event of sudden emergency, an impact or remote-activated switch is used to direct the controller 10 to communicate the location for rescue assistance. A compact package of the controller 10, the receiver 20, and the communications apparatus 24 is installed in life rafts and boats to provide immediate reporting of the location of survivors.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departing from the spirit of the invention as described in the following claims.

What is claimed is:

1. An apparatus for monitoring a status and location of an aircraft, comprising:
    a receiver attached to an aircraft for receiving a positioning signal from each of a plurality of transmitters located at separate known locations;
    a switch located on the aircraft and indicating a status of the aircraft;
    a controller operatively connected to the receiver and the switch for determining the location of the aircraft based upon the positioning signals, said controller detecting the status of the aircraft by sensing the switch;
    a communicator operatively connected to the controller for communicating a signal to the air traffic control center to report the status and location of the aircraft in response to the switch.

2. The apparatus as recited in claim 1, wherein the controller comprises a microprocessor.

3. The apparatus as recited in claim 2, wherein said communicator comprises a wireless cellular telephonic transmitter.

4. The apparatus as recited in claim 1, further comprising:
    a second switch located on the aircraft and operatively connected to the controller, said second switch being responsive to a high-impact force to signal the controller to initiate communications with an air traffic control center for reporting the location of said aircraft which has been downed.

5. The apparatus of claim 1 wherein said receiver comprises a global positioning system (GPS) receiver for receiving positioning signals from a plurality of GPS satellites.

6. The apparatus of claim 1, wherein said switch comprises a plurality of switches, each indicating an unique status of the aircraft.

7. The apparatus of claim 1 wherein said switch comprises an automatic switch operatively connected to the aircraft landing gear for automatically indicating that the aircraft is landing.

8. The apparatus of claim 1 wherein said switch comprises an emergency switch located on the aircraft, the emergency switch indicating whether or not the aircraft is in an emergency situation and requires assistance.

9. A method of monitoring a status and location of an aircraft, comprising the steps of:
    a) receiving at the aircraft a positioning signal from each of a plurality of transmitters positioned at separate known locations;
    b) determining a current location of the aircraft based upon the received positioning signals;
    c) sensing a switch, the switch located on the aircraft and indicating the status of the aircraft;
    d) communicating a signal from the aircraft to a central station to report the status and the location of the aircraft, in response to said step of sensing the switch.

10. The method of claim 9, wherein said step of receiving comprises the step of receiving at the aircraft a positioning signal from each of a plurality of transmitters located on global positioning system (GPS) satellites.

11. The method of claim 9, wherein said step of sensing comprises the step of periodically polling each of a plurality of switches located on the aircraft to determine the status of the aircraft, each of the switches indicating an unique status of the aircraft.

12. The method of claim 9 wherein said step of sensing comprises the step of sensing the position of a down-aircraft switch, the down-aircraft switch indicating that the aircraft is unintentionally down when the switch is in an actuated position.

13. The method of claim 12 wherein said step of communicating comprises the step of communicating a signal from the aircraft to a central station to report the location of the aircraft and to report that the aircraft is down if the down-aircraft switch is sensed to be in the actuated state, the down-aircraft switch being automatically actuated when the aircraft is downed.

14. The method of claim 9 wherein said step of sensing comprises the step of sensing the state of a flight-plan switch, the flight-plan switch indicating that the flight plan is to be closed when the flight-plan switch is in the actuated state.

15. The method of claim 9 wherein said step of sensing comprises the step of sensing the state of an emergency switch located on the aircraft, the emergency switch indicating when in an actuated state that the aircraft is in an emergency and requires assistance.

16. The method of claim 15 wherein said step of communicating comprises the step of communicating a signal from the aircraft to a central station to periodically report the location of the aircraft and to report that the aircraft is in a state of emergency if the emergency switch is in an actuated state.

17. The method of claim 9 further comprising the step of sensing on the aircraft a request to close the aircraft's flight plan, said step of communicating further comprises the step of communicating to the central station the request to close the aircraft's flight plan to the central station in response to said step of sensing the request to close the aircraft's flight plan.

18. The method of claim 17, wherein said step of sensing a request to close the aircraft's flight plan comprises the step of sensing the state of a manual flight-plan switch located on the aircraft, the flight-plan switch indicating that the flight plan is to be canceled when the flight-plan switch has been actuated.

19. The method of claim 9 wherein said step of sensing comprises the step of sensing the state of an automatic switch operatively connected to the aircraft landing gear for automatically indicating that the aircraft is landing upon lowering of the landing gear.

20. The method of claim 19 wherein said step of communicating comprises communicating a signal from the aircraft to the central station to identify the aircraft, to report that the aircraft is landing, to request closing of the aircraft's flight plan and to report the location of the aircraft, in response to said step of sensing.

* * * * *